June 29, 1943.  H. KLAUE  2,323,052
DISK BRAKE FOR USE IN MOTOR CARS, AIRPLANES AND THE LIKE
Filed Aug. 22, 1940  2 Sheets-Sheet 1

Inventor
Hermann Klaue
by E. A. Oser.
Agent

June 29, 1943.  H. KLAUE  2,323,052
DISK BRAKE FOR USE IN MOTOR CARS, AIRPLANES AND THE LIKE
Filed Aug. 22, 1940  2 Sheets-Sheet 2
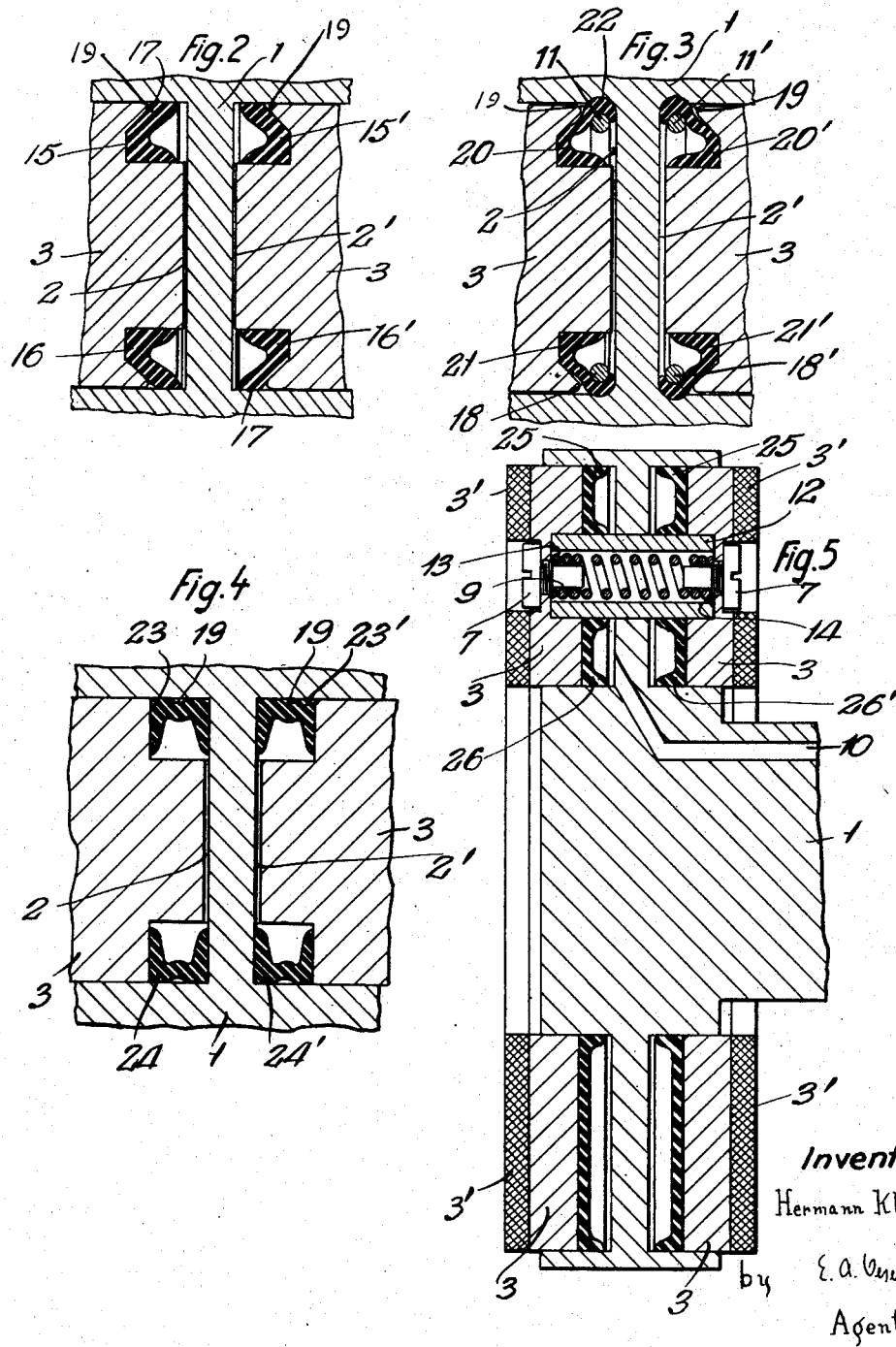
Inventor
Hermann Klaue
by E. A. Venn.
Agent Patented June 29, 1943

2,323,052

UNITED STATES PATENT OFFICE 2,323,052

DISK BRAKE FOR USE IN MOTOR CARS, AIRPLANES, AND THE LIKE

Hermann Klaue, Berlin-Frohnau, Germany; vested in the Alien Property Custodian

Application August 22, 1940, Serial No. 353,644
In Germany February 22, 1940

5 Claims. (Cl. 188—152)

The present invention relates to disk brakes designed for use in motor driven vehicles, motorcars, aircraft and the like and provided with resilient yielding disks the outer surface of each of which carries a friction lining, said disks being biased and adapted to be shifted apart from each other and into contact with the members to be braked by means of a fluid pressure medium introduced between them. More particularly the invention is concerned with the arrangement and guidance of the disks carrying the friction lining, the sealing of these disks against the space of the preferably cylindrical brake disks carrier containing the braking medium, as well as with the spring arrangement connecting said disks to each other.

Brakes of this construction have a number of advantages as examples of which the large braking surface available, the narrow and light construction and the possibility of easily encasing the various members of the brake may be mentioned.

With brakes of this kind it is known to arrange between the disks an inflatable casing consisting of a resilient material, for instance rubber, for receiving the pressure medium. This material, however, gives rise to break-downs.

To prevent expansion of the inflatable casing radially outwardly it has already been proposed to provide a bead at the circumference of the brake disks. This arrangement, however, also has the drawback that with the slightest damage of the inflatable casing occurring a transmission of pressure upon the brake disks and, therefore, braking is rendered impossible.

According to the present invention, therefore, instead of using an inflatable casing, a stationary preferably cylindrical brake disk carrier is mounted within the brake housing which at the margin of both surfaces is provided with annular recesses. Fitted into each of these recesses is a brake disk the outer surface of which carries a brake lining. These brake disks may, against the action of tension springs, be shifted in a known manner under the influence of a fluid pressure medium so that the brake lining may be forced against corresponding brake surfaces. To prevent the escape of fluid braking medium and to provide a reliable sealing between the walls of the annular recesses and the brake discs guided therein, special biased sealing rings of various cross section are arranged. The shape of these cross sections proposed according to the invention allows a movement of the brake disks without subjecting the sealing rings to a sliding movement. Another important feature of the present invention consists in connecting together the brake disks, arranged at both surfaces of the carrier, by means of tensioned springs.

By the construction indicated above the reliability and braking effect of the disk brake is substantially increased with regard to hitherto known constructions. A safe guidance of the brake disks in an axial direction is always ensured so that always the total friction lining comes into contact with the brake lining. Hereby a one-sided wear of the braking surfaces is obviated and the working life of such a braking arrangement is considerably increased.

Further features of the invention will result from the drawings and the specification relating thereto.

In these drawings some modifications of disk brakes according to the invention are shown by way of example.

In these drawings:

Figs. 2, 3, 4 and 5 show various cross sections of sealing rings adapted to be used in accordance with the invention.

Figure 1:
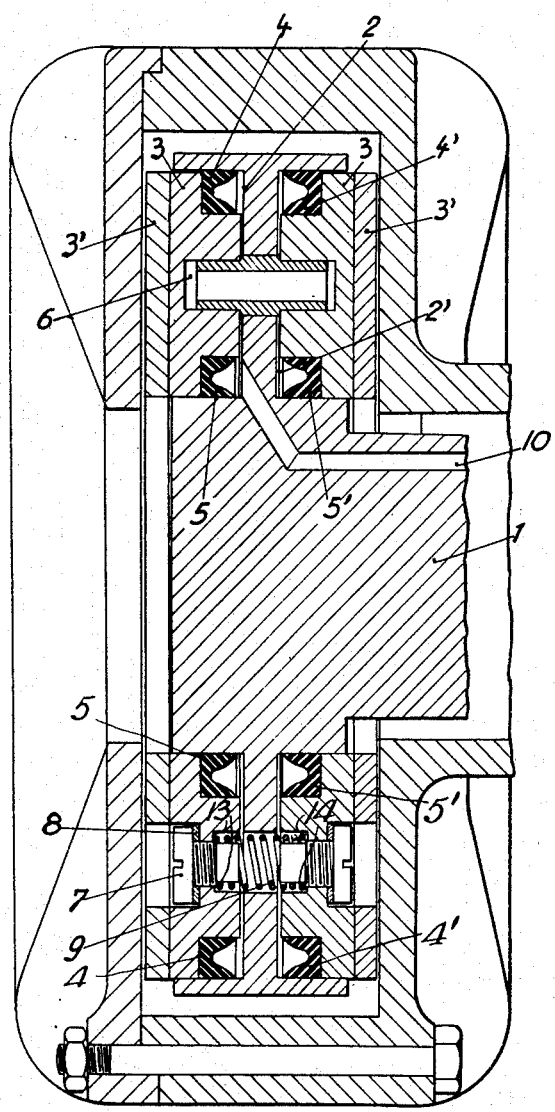
Fig. 1 is a section through a disk brake according to the invention.

As shown in Fig. 1 the carrier 1 for the brake disks has annular recesses 2 and 2' at its surfaces. This carrier 1 for the brake disks transfers the braking moment. The brake disks 3 provided with the brake lining 3' may axially be shifted in the annular recesses 2 and 2'. In the construction shown in Fig. 1 the brake disks 3 and the brake lining 3' consist of different materials. Both parts, however, may be made of a single piece and of a material suitable for braking purposes. Rings 4, 4' and 5, 5' serve for sealing the fluid braking medium between the brake disks 3 and the carrier 1. Bolts 6 uniformly distributed about the circumference transfer the torsional moment from the brake disks 3 upon the carrier 1. These bolts 6 allow a free axial movement of both brake disks. The latter are held together by biased tension springs 9 which extend through the carrier 1 of the brake disks and preferably are uniformly distributed about the circumference of said carrier 1. Fixed to the brake disks 3 by means of threaded bolts 7 are the springs 9 and the thread of the bolts 7 corresponds to the pitch of the spring. To prevent the escape of the fluid braking medium by way of the bores for the bolts 7 packing rings 8 are provided which are brought into the sealing position by the fact that the ends of spring 9 serving as nuts are brought into contact with shoulders 13, 14 formed in the bore. In the carrier 1 for the brake disks 3 a passage 10 is provided which serves to supply the braking medium.

Figs. 2-4 show sealing rings of various cross sections all of which allow movement of the brake disks without themselves being subjected to a sliding movement. In the modifications shown in Figs. 2 to 4 a space 19 is normally provided in the inoperative position of the brake between the carrier and the portion of the packing rings bearing against the carrier. More particularly space 19 is located between the carrier, the packing rings and the brake disks.

Fig. 2 for instance shows a shape of sealing rings 15, 15' and 16, 16' with obliquely supported lips 17. Due to the oblique position of the outer lip 17 the sealing rings 15, 15' and 16, 16' are not subjected to a destructive stress if the brake disks 3, 3 are axially moved.

Fig. 3 shows a cross section of the sealing rings 20, 20' and 21, 21' which allows movements of the brake disks 3, 3 without sliding of the sealing lip 22. Preferably sealing lips 22 are held in position by expanding rings or annular springs 11, 11' and 18, 18'.

A further modified shape of the cross section of the sealing rings 23, 23' and 24, 24' is shown in Fig. 4. Here a movement of the brake disks 3 is possible by the change of shape of the sealing rings 23, 23' and 24, 24' without the latter being subjected to a sliding movement.

Fig. 5 shows a modification according to which the tension springs 9 connecting the brake disks 3 are arranged in a sleeve 12 tightly fitted into the disks 3. Due to this construction the arrangement of packing rings 8 is rendered superfluous. The sealing rings 25, 25' and 26, 26' closing the hollow spaces, receiving the braking medium, against the brake disks 3 in this case are of well known U-shaped cross section. The sleeve 12 simultaneously serves to transfer the braking moment upon the carrier 1 for the brake disks.

What I claim is:

1. A fluid operated brake for a vehicle wheel comprising a substantially disk-shaped carrier having concentrically arranged annular recesses at both surfaces, two stationary annular friction braking elements axially slidably mounted in said annular recesses, each of said braking elements being provided with a frictional lining at its outer surface, a rotatable member to be braked enclosing said carrier and said friction braking elements, a space being provided between said friction braking elements and said carrier for admitting a fluid braking medium for shifting said friction braking elements apart from each other and for bringing them into frictional engagement with said rotating member, and packing rings having a portion bearing against said carrier for sealing said friction braking elements against the fluid braking medium, lips on said packing rings, a space being normally provided in the inoperative position of the brake between said carrier and said portion of the packing rings, whereby, when said friction braking elements are forced apart, said packing rings substantially do not slide along the recesses in said carrier.

2. A fluid operated brake for a vehicle wheel comprising a substantially disk-shaped carrier having concentrically arranged annular recesses at both surfaces, two stationary annular friction braking elements axially slidably mounted in said annular recesses, each being provided with a frictional lining at its outer surface, a rotatable member to be braked enclosing said carrier and said friction braking elements, a space being arranged between said friction braking elements and said carrier for admitting the fluid braking medium for shifting said friction braking elements apart from each other and for bringing them into frictional engagement with said rotating member, a plurality of spaced threaded bolts for connecting said carrier with each of said friction braking elements, tension springs for urging said friction braking elements towards each other having their free ends formed as nuts for cooperation with said bolts, said springs and said bolts having the same thread, shoulders in said friction braking elements against which said springs are adapted to bear, and packing rings having a portion bearing against said carrier for sealing said friction braking elements against the fluid braking medium, lips on said packing rings, a space being normally provided in the inoperative position of the brake between said carrier and said portion of the packing rings, whereby, when said friction braking elements are forced apart said packing rings substantially do not slide along the recesses in said carrier.

3. A fluid operated brake for a vehicle wheel comprising a substantially disk-shaped carrier having concentrically arranged annular recesses at both surfaces, two stationary annular friction braking elements axially slidably mounted in said annular recesses, each of said braking elements being provided with a frictional lining at its outer surface, a rotatable member to be braked enclosing said carrier and said friction braking elements, a space being provided between said friction braking elements and said carrier for admitting a fluid braking medium for shifting said friction braking elements apart from each other, and packing rings for sealing said friction braking elements against the fluid braking medium, an outwardly directed lip on each of said braking rings bearing against said carrier, a space being normally provided in the inoperative position of the brake between said carrier and said lips, whereby when said friction braking elements are forced apart the lips on said braking rings substantially do not slide along the recesses in said carrier.

4. A fluid operated brake for a vehicle wheel comprising a substantially disk-shaped carrier having concentrically arranged annular recesses at both surfaces, two stationary annular friction braking elements axially slidably mounted in said annular recesses, each of said braking elements being provided with a frictional lining at its outer surface, a rotatable member to be braked enclosing said carrier and said friction braking elements, a space being provided between said friction braking elements and said carrier for admitting a fluid braking medium for shifting said friction braking elements apart from each other, and packing rings for sealing said friction braking elements against the fluid braking medium, an inwardly curved lip on each of said packing rings bearing against said carrier, an annular ring pressing against said lips for holding said packing rings in position, a free space being normally provided in the inoperative position of the brake between said carrier and said lips, whereby sliding of the lips on said braking rings along the recesses in said carrier is prevented when said friction braking elements are forced apart.

5. A fluid operated brake for a vehicle wheel comprising a substantially disk-shaped carrier having concentrically arranged annular recesses at both surfaces, two stationary annular friction braking elements axially slidably mounted in said annular recesses, each of said braking elements being provided with a frictional lining at its outer surface, a rotatable member to be braked enclosing said carrier and said friction braking elements, a space being provided between said friction braking elements and said carrier for admitting a fluid braking medium for shifting said friction braking elements apart from each other, and packing rings for sealing said friction braking elements against the fluid braking medium, said packing rings having a substantially U-shaped cross section with the web portion of the U bearing against said carrier, the middle portion of the web of said packing rings being normally spaced in the inoperative position of the brake from said carrier, whereby when said friction braking elements are forced apart said middle portion is pressed against said carrier.

HERMANN KLAUE.